July 12, 1966  J. HANDLEY  3,260,450
MECHANICAL AGGREGATORS

Filed Sept. 23, 1964  4 Sheets-Sheet 1

INVENTOR
JOHN HANDLEY
BY
Kenway, Jenney & Hildreth
ATTORNEYS

United States Patent Office 3,260,450
Patented July 12, 1966

3,260,450
MECHANICAL AGGREGATORS
John Handley, 39 Wilhelmina Ave., Coulsdon, England
Filed Sept. 23, 1964, Ser. No. 398,631
Claims priority, application Great Britain, Sept. 27, 1963, 38,274/63
6 Claims. (Cl. 235—61)

This invention relates to mechanical numerical aggregators and has for its object aggregators which are lighter in construction and more accurate in operation than those previously known.

The main aspect of the invention comprises a mechanical numerical aggregator for aggregating a number of basic movement in stages wherein all the movements in all the stages are in the same direction.

The invention will be clearly understood from the following description of certain embodiments thereof shown in the accompanying drawings in which:

FIG. 2 shows schematically the arrangement and alternative dimensions of a modified form of FIG. 1 capable of use both for binary and decimal aggregation, while

Figure 1:
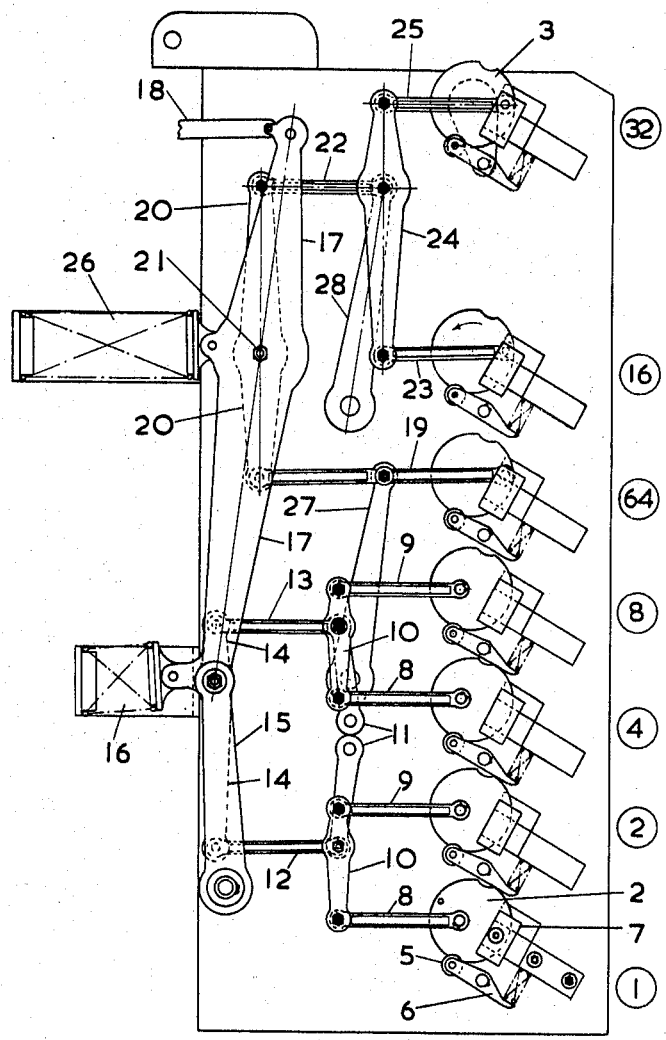
FIG. 1 shows a binary aggregator incorporating the invention.
Figure 3:
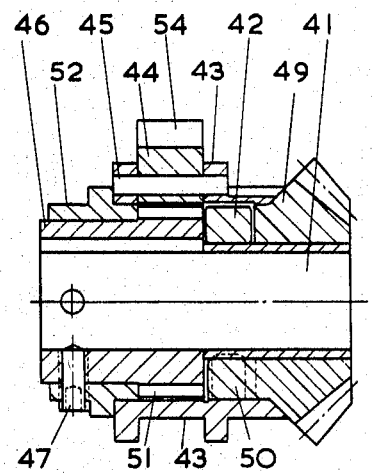
FIGS. 3–7 show different views of the clutch mechanism for operating the eccentrics in FIG. 1 or FIG. 2.
Figure 4:
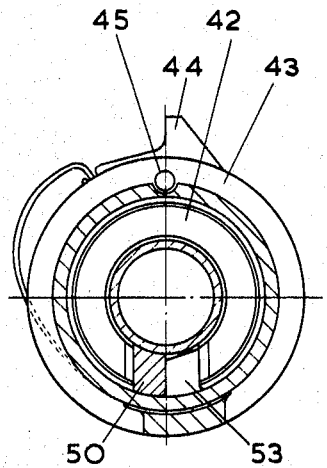
Figure 5:
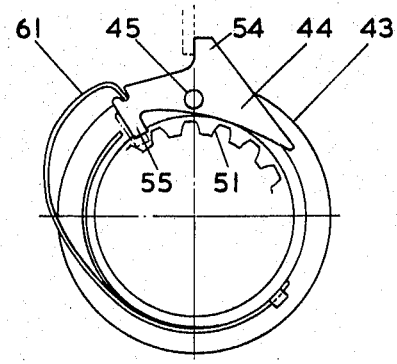
Figure 6:
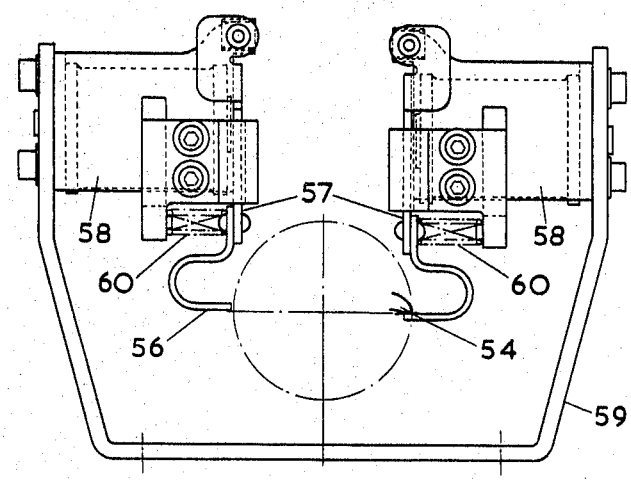

The aggregate motion shown in FIG. 1 comprises a number of stages in each of which the basic movement is given by a crank disc 2, 3, arranged to rotate between two diametrically opposite positions under control of individual clutch drives one per stage, from a continuously rotating drive shaft in known manner. Each clutch, FIGS. 3–6, which comprises a square-toothed ratchet 46, FIG. 3, is keyed to the shaft 41 adjacent a bevel gear 49 free on the shaft, with an axially extending tooth 50 forming part of the clutch as described below.

The teeth 51 of the ratchet 46 extend over part only of the width of the ratchet body, the remainder of which carries a bearing ring 52 pinned at 47 to the body 46. A clutch body 43 is rotatably mounted on the ring 52 and extends over the tooth 50 on the gear 49. A second tooth 53, FIG. 4, extends inwardly from the clutch body 43 adjacent to and rotatably coplanar with the tooth 50. In the annular space within the clutch body 43 between the ratchet body 46 and the gear 49 and extending around the space from tooth 50, FIG. 4, to tooth 53 is a heavy horseshoe-shaped cast-steel spring which is a loose fit in the space and normally exerts a small pressure on the teeth.

The bearing ring 43 is peripherally slotted by making two angularly-spaced tangential cuts and a pawl 44 is pivotally mounted in the slot on a pin 45. The pawl has a solid blunt ratchet-engaging tooth 55. The pawl tooth 55 is urged towards the ratchet by a curved spring 61, FIG. 5, which is carried by a circlip 62 mounted in a groove in the bearing ring. The spring 61 engages a recess in the pawl 44 and urges the pawl tooth 55 into the ratchet. Pawl 44 has an outwardly-extending dog 54 adapted to be engaged by spring pawls 56 on the armatures 57 of diametrically-opposed radially-arranged electromagnets 58, FIG. 6, the pawls 56 of which are alternately moved into the path of said dog 54 on the clutch pawl 44. Normally the dog 54 is in contact with one armature pawl 56 which is held in the path of 54 by its magnet return spring 60. As a result, the pawl 44 is turned away from the ratchet so that there is no drive to the gear. The electromagnets themselves are mounted on the vertical legs of a U-shaped spring steel bracket 59 embracing the clutch and mounted on the machine frame.

Figure 7:
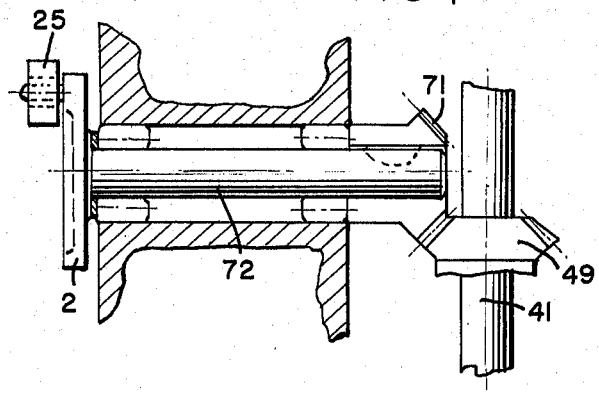

To turn the gear through half a revolution, the magnet 58 of the obstructing armature pawl 56 is energized to withdraw its pawl from the path of dog 55 and the other magnet is deenergized so that its armature pawl projects into the path of the dog. The retraction of the previously projecting armature pawl allows the clutch pawl 44 to rotate into engagement with ratchet 51 and to rotationally connect the shaft 41 to the gear 49 which is rotated until the dog 54 engages the other armature pawl 56 which is now projected. As a result the pawl 44 is rotated out of the ratchet and the gear is stopped after half a revolution. The corresponding crank such as 2 (FIG. 7) is also rotated through 180° by means of the bevel gear 49 coacting with a bevel gear 71 on a shaft 72 to which the crank 2 is affixed. The clutch drive to gear 49 is via the teeth 50, 53, FIG. 4, held together by spring 42 which acts as a shock absorber on starting and stopping. In the same way, the spring and armature pawls 56 and the spring mounting bracket 59, FIG. 6, also absorb shock.

When a new binary code is received by the electronic control circuit, the latter will change the application of operating signals to the clutch magnets of all the stages from a combination determined by the previous code received to one determined by the new code. In every case, a signal will be applied to one only of the two clutch magnets controlling the clutch of that stage and if the magnet now energized is the one which was not energized by the previous code, the clutch will be operated to change the setting of the corresponding crank.

In order to cushion the starting and stopping of the clutch gear, the gear and its extension are not unitary but are connected through heavy circular steel spring 42.

During starting and to a lesser extent when stopping, the forces attempting to rotate the two parts of the gear assembly with respect to one another will be transmitted via teeth 50, 53, and will result in a little "give" by the spring to cushion the shock. Each crank has diametrically opposite edge grooves 4 to receive a positioning roller 5 on a spring-pressed lever 6.

Each crank 2, 3, FIG. 1, has two small diametrically opposed holes, one or other of which should line up with a light cell detector 7 arranged to signal the correct setting of the crank and its position. The pairs of cranks comprising numbers 1 and 2 cranks from the bottom, and numbers 3 and 4 cranks constitute pairs in each of which both cranks have the same small eccentricity. The upper three cranks have much larger eccentricities.

The lowest pair of cranks and the next pair are linked together in identical manner by means of two equal links 8, 9, pivoted to the two crank pins and a beam 10 connecting the other ends of links 8, 9. Levers 11 mounted on fixed pivots are pivotally connected to the beams 10 at a point dividing the beam so that the upper part is half the length of the lower part. These same points on beams 10 are connected by links 12, 13 to the ends of a beam 14. The levers 11 guide the links 8, 9 to move substantially horizontally.

A lever 15 pivotally mounted on a fixed pivot is pivotally connected to a point on beam 14 to cause that point to move substantially horizontally. That same point on beam 14 is connected to a damping spring 16, and to one end of a beam 17, the other end of which is connected to a rod 18 for operating the readarm shaft.

The crank pin of the fifth crank is pivotally connected by a long link 19 to one end of a beam 20 which is intermediately pivoted to beam 17 at 21 and is connected by a link 22 at its other end to a linkage 23, 24, 25 which interconnects the top pair of crank pins in a similar manner to the linkage for the bottom pair. The beam 17 is also intermediately connected to a damping spring 26, while link 19 and beam 24 are supported and guided by arms 27, 28, which are mounted on fixed pivots and act similarly to the lever arms 11 to guide these members so that they move horizontally.

The lower four cranks are shown in the "1" position, in which they have raised the mid-points of beams 10 a distance equal to the throw of the individual cranks. If the lower pair, or the next pair, of cranks was moved through 180° to the "0" position, the mid-point of their beam 10 would be in the "00" position for the binary pair. If the lowest crank was now turned to the "1" position, the link 12 would be moved axially by one-third of the crank throw; if the second crank was turned instead, the link 12 would be moved by two-thirds of the crank throw. When both cranks are simultaneously moved to the "1" position, the link 12 would be moved by a distance equal to the common crank throw. The result is that the bottom two pairs of cranks and the top pair of cranks will each move their links 12, 13, 22, by one-third, two-thirds and three-thirds of the throw of their respective cranks. The purpose of the three pairs of cranks is to apply binary digits 1 and 2; 4 and 8; 16 and 32. The purpose of crank five is to apply digit 64 to the aggregator. These four primary parts of the linkage are interconnected to the secondary beams 14, 20, which are in turn connected to the final beam 17.

The relative dimensions of the throws of the cranks, and of the secondary beams, together with the ratios between the parts of the secondary beams on each side of their intermediate pivots, and of course the position of the intermediate pivots of the beams 10, 24, already discussed, are such that the upper end of final beam 17 moves horizontally to positions determined by the binary sum of binary codes applied to the magnets controlling the positions of the cranks, all the movements at each stage being in the horizontal direction.

Figure 2:
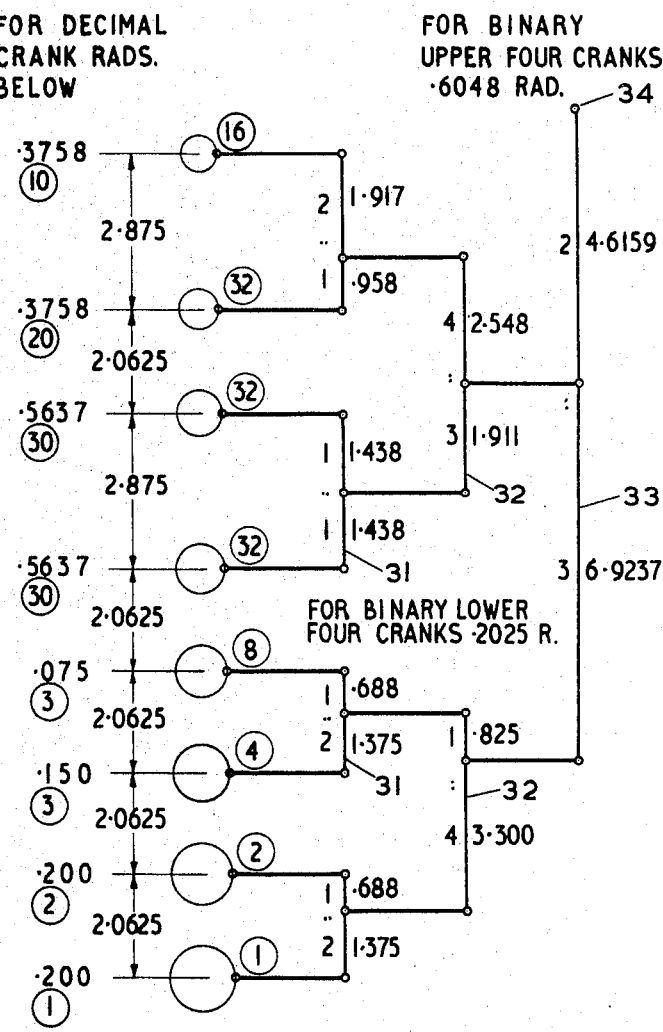

FIG. 2 shows schematically a variation of FIG. 1 comprising eight eccentrics 35 each pair of which are linked to a respective primary beam 31. Pairs of primary beams are linked to two secondary beams 32 which in turn control a final beam 33 the free end 34 of which is the aggregation point.

By having an even number of eccentrics, the need for a long link such as 19, FIG. 1, direct from an eccentric to a secondary beam is obviated. On the other hand, if only six eccentrics—or, say, ten eccentrics—were provided, there would be an odd number of primary beams 31, one of which would have to be linked directly to the final beam 33, or to one of two tertiary beams in the case of ten eccentrics.

The dimensions given on FIG. 2 have been so arranged that alternative sets of eccentrics can be used to give true binary operation 1, 2—64; or alternatively to respond to a special code 1, 2, 3, 3, 30, 30, 20, 10 designed to give a total of 100: that is, decimal selection.

It will be seen that this type of aggregation is very flexible in its application and is capable of many variations both in size and in the type of code to which it will respond.

Of course, the eccentrics could be replaced by devices capable of moving their respective links to more than two predetermined positions, and the devices could differ from one another in this respect. Cams could replace the eccentrics.

Again, an intermediate point on the final beam could be used as the aggregation point instead of the cantilever position 34.

Cantilever beams could also be used at preceding stages.

The links between the cranks and the first row of beams, and between succeeding stages of beams are not essential. The first row of beams could be directly pivoted to the eccentrics, and the second row of beams directly to the first row, just as in FIG. 1, the final beam is directly pivoted to the previous pair of beams.

It will be noted in FIG. 2 that, in order to obtain the maximum throw of point 34, the pivots of the top four eccentrics should start in their left-hand positions and rotate through 180° to the positions shown, thus rotating the final beam clockwise about its lower pivot, and moving point 34 to the right; while the pivots of the bottom four eccentrics should start in their right-hand positions as shown, and rotate through 180° to their left-hand positions, thus rotating the final beam clockwise about its intermediate pivot, and again moving point 34 to the right.

Having thus described my invention, what I claim is:

1. An apparatus for aggregating a number of basic movements which are spaced along a base line and arranged for discrete selective positioning in one of two predetermined positions, which positions define a line that is normal to the base line comprising, in combination: a plurality of rotors one for developing each of the basic movements at its output, and each containing two detents separated by 180° to establish the two predetermined positions of the basic movements; a plurality of first beams, each substantially parallel to the base line, each connected at spaced linkage points to the output of a different pair of the rotors and each providing an output movement at a point spaced from the linkage points; and at least one second beam, connected at separate linkage points to the output of a pair of first beams, and providing an output movement at a point spaced from the linkage points.

2. Aggregator as claimed in claim 1 wherein said rotors are eccentrics.

3. Aggregator as claimed in claim 1 wherein each said rotor is driven from a continuously rotating shaft via a clutch incorporating a spring-shock-absorber.

4. Aggregator as claimed in claim 3 wherein each said clutch comprises driving and driven rotors which are interconnected by teeth thereon extending side by side into an annular space containing a cast steel horseshoe spring which normally presses said teeth together and which is adapted to spring open slightly for shock absorption.

5. Aggregator as claimed in claim 3 wherein each said clutch incorporates a ratchet and a pawl which is pivotally-mounted and spring-urged towards the ratchet and which has an outwardly-extending dog for engagement with diametrically-opposed spring-mounted stop members mounted for radial movement into and out of the path of said dog.

6. Aggregator as claimed in claim 5 wherein said stop members are mounted on the armatures of electromagnets by which the stop members are operated and which are carried by a shock-absorbing mounting.

References Cited by the Examiner

UNITED STATES PATENTS

| | | | |
|---|---|---|---|
| 259,852 | 6/1882 | Hale | 192—28 |
| 699,379 | 5/1902 | French | 192—28 |
| 1,682,889 | 9/1928 | Creed | 192—28 |
| 2,073,921 | 3/1937 | Caracristi | 235—61 X |
| 2,179,822 | 11/1939 | Imm | 235—61 |
| 2,579,220 | 12/1951 | Vine | 235—61 |
| 2,858,388 | 10/1958 | Eastman | 192—28 X |
| 3,019,968 | 2/1962 | Imm | 235—61 |
| 3,137,444 | 6/1964 | Harada | 235—117 |

LOUIS J. CAPOZI, *Primary Examiner.*

LEO SMILOW, *Examiner.*

C. G. COVELL, W. F. BAUER, *Assistant Examiners.*